(12) United States Patent
Ramsey et al.

(10) Patent No.: US 10,579,982 B2
(45) Date of Patent: Mar. 3, 2020

(54) IDENTIFYING MONEY LAUNDERING IN MICRO-COMMERCE

(75) Inventors: Mark S. Ramsey, Kihei, HI (US); David A. Selby, NR Fareham (GB)

(73) Assignee: International Business Machines Corporation, Armonk, NY (US)

( * ) Notice: Subject to any disclaimer, the term of this patent is extended or adjusted under 35 U.S.C. 154(b) by 1728 days.

(21) Appl. No.: 13/342,269

(22) Filed: Jan. 3, 2012

(65) Prior Publication Data

US 2013/0173441 A1 Jul. 4, 2013

(51) Int. Cl.
*G06Q 40/00* (2012.01)
*G06Q 20/22* (2012.01)

(52) U.S. Cl.
CPC .................. *G06Q 20/29* (2013.01)

(58) Field of Classification Search
CPC ........ G06Q 20/10; G06Q 20/29; G06Q 20/40; G06Q 20/102; G06Q 30/04; G06Q 30/06; G06Q 40/00; G06Q 40/02; G06Q 40/025
USPC ...................................................... 705/35–42
See application file for complete search history.

(56) References Cited

U.S. PATENT DOCUMENTS

| | | | |
|---|---|---|---|
| 6,055,508 A | 4/2000 | Naor et al. | |
| 7,263,506 B2 | 8/2007 | Lee et al. | |
| 7,395,241 B1 | 7/2008 | Cook et al. | |
| 7,596,530 B1 | 9/2009 | Glasberg | |
| 8,544,727 B1 * | 10/2013 | Quinn ................... | G06Q 40/00 235/379 |
| 2003/0033228 A1 * | 2/2003 | Bosworth-Davies ....................... | G06Q 20/04 705/35 |
| 2003/0144894 A1 | 7/2003 | Robertson et al. | |
| 2003/0177087 A1 * | 9/2003 | Lawrence .............. | G06Q 20/04 705/38 |
| 2004/0117316 A1 * | 6/2004 | Gillum .................. | G06Q 10/10 705/64 |
| 2004/0177035 A1 * | 9/2004 | Silva ..................... | G06Q 20/10 705/39 |
| 2005/0137016 A1 * | 6/2005 | Enzminger ............ | G07F 17/32 463/42 |
| 2006/0178982 A1 | 8/2006 | Ramsey et al. | |
| 2007/0250441 A1 * | 10/2007 | Paulsen ................. | G06Q 20/02 705/39 |

(Continued)

OTHER PUBLICATIONS

Sohn, Ira; "A Primer on Money Laundering: the Dark Side of Capital Account Liberalization", International Trade and Finance Association, 2002, 20 pages. (Year: 2002).*

(Continued)

*Primary Examiner* — Hani M Kazimi
(74) *Attorney, Agent, or Firm* — Law Office of Jim Boice (57) ABSTRACT

A processor-implemented method, system, and/or computer program product detects illicit activities in micro-commerce transactions. An historic transaction pattern of known legitimate past micro-commerce transactions by a cohort is identified. A current transaction pattern for a current set of multiple micro-commerce transactions is also identified. The current transaction pattern and the historic transaction pattern are compared. In response to determining that the current transaction pattern deviates from the historic transaction pattern beyond a predetermined level, a determination is made that the current set of multiple micro-commerce transactions are being used for money laundering.

20 Claims, 3 Drawing Sheets

(56) References Cited

U.S. PATENT DOCUMENTS

| | | | | |
|---|---|---|---|---|
| 2008/0040275 A1* | 2/2008 | Paulsen | G06Q 20/40 | |
| | | | 705/44 | |
| 2008/0110982 A1* | 5/2008 | Song | G06Q 30/04 | |
| | | | 235/381 | |
| 2008/0270206 A1* | 10/2008 | Gillum | G06Q 10/10 | |
| | | | 705/35 | |
| 2009/0125369 A1* | 5/2009 | Kloostra | G06Q 10/00 | |
| | | | 705/35 | |
| 2010/0004981 A1* | 1/2010 | Katz | G06Q 40/02 | |
| | | | 705/38 | |
| 2010/0106611 A1* | 4/2010 | Paulsen | G06Q 20/10 | |
| | | | 705/26.1 | |
| 2011/0131123 A1* | 6/2011 | Griffin et al. | 705/35 | |
| 2012/0116956 A1* | 5/2012 | Altman et al. | 705/39 | |
| 2012/0203663 A1* | 8/2012 | Sinclair et al. | 705/26.41 | |
| 2012/0215691 A1* | 8/2012 | Tal | G06Q 20/02 | |
| | | | 705/44 | |

OTHER PUBLICATIONS

Young, Carl. "Periodic Account Activity and Automated Money Laundering Detection," Journal of Money Laundering Control, (Spring 2004), p. 295. (Year: 2004).*

Money Laundering (online). Wikipedia, [retrieved on Sep. 11, 2006. Retrieved from the Internet: pp. 1-7. (Year: 2006).*

* cited by examiner

IDENTIFYING MONEY LAUNDERING IN MICRO-COMMERCE

BACKGROUND

The present disclosure relates to the field of computers, and specifically to the use of computers in electronic financial transactions. Still more particularly, the present disclosure relates to the use of computers in detecting money laundering activities in micro-commerce transactions.

Micro-commerce is defined as electronic commerce that uses transactions that each have a value that is below a predefined limit (e.g., less than $1.00 USD). That is, micro-commerce utilizes micro-payments (e.g., less than $1.00 USD) to pay for each of highly numerous (i.e., higher than some minimum quantity, such as 1,000 transactions per hour) transactions. One example of micro-commerce is downloading music, in which millions of consumers may download a million songs every day, with each song download costing 99 cents. In another example of micro-commerce, consumers of applets or other small software packets may pay a small amount (e.g., less than 1 cent) for each use of such software.

SUMMARY

A processor-implemented method, system, and/or computer program product detects illicit activities in micro-commerce transactions. An historic transaction pattern of known legitimate past micro-commerce transactions by a cohort is identified. A current transaction pattern for a current set of multiple micro-commerce transactions is also identified. The current transaction pattern and the historic transaction pattern are compared. In response to determining that the current transaction pattern deviates from the historic transaction pattern beyond a predetermined level, a determination is made that the current set of multiple micro-commerce transactions are being used for money laundering.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
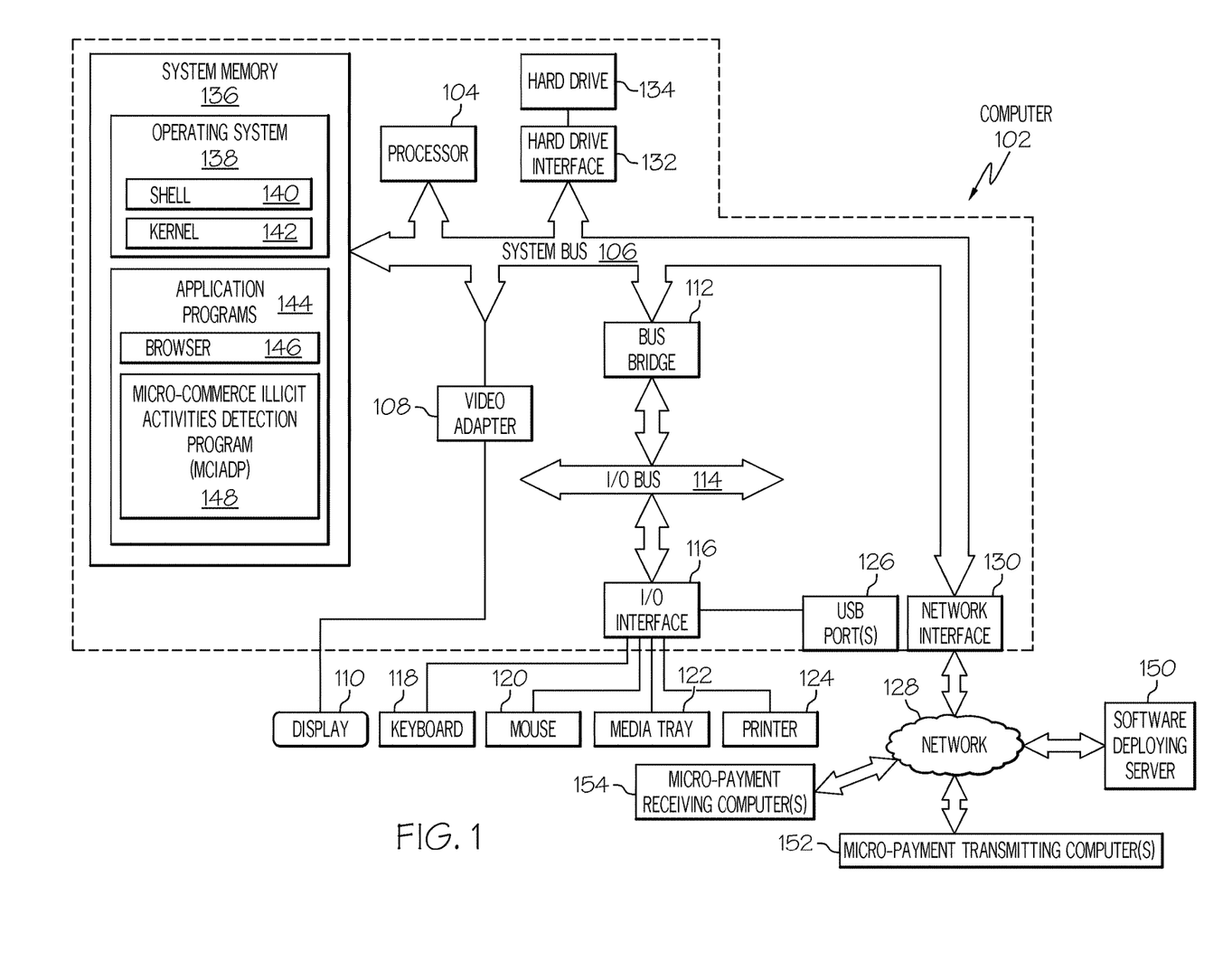
FIG. 1 depicts an exemplary system and network in which the present disclosure may be implemented.

With reference now to the figures, and in particular to FIG. 1, there is depicted a block diagram of an exemplary system and network that may be utilized by and in the implementation of the present invention. Note that some or all of the exemplary architecture, including both depicted hardware and software, shown for and within computer 102 may be utilized by software deploying server 150, micro-payment transmitting computer(s) 152 and/or micro-payment receiving computer(s) 154.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, as well as micro-payment transmitting computer(s) 152 and/or micro-payment receiving computer(s) 154, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file.

Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a micro-commerce illicit activities detection program (MCIADP) 148. MCIADP 148 includes code for implementing the processes described below, including those described in FIG. 2. In one embodiment, computer 102 is able to download MCIADP 148 from software deploying server 150, including in an on-demand basis, wherein the code in MCIADP 148 is not downloaded until needed for execution. Note further that, in one embodiment of the present invention, software deploying server 150 performs all of the functions associated with the present invention (including execution of MCIADP 148), thus freeing computer 102 from having to use its own internal computing resources to execute MCIADP 148.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
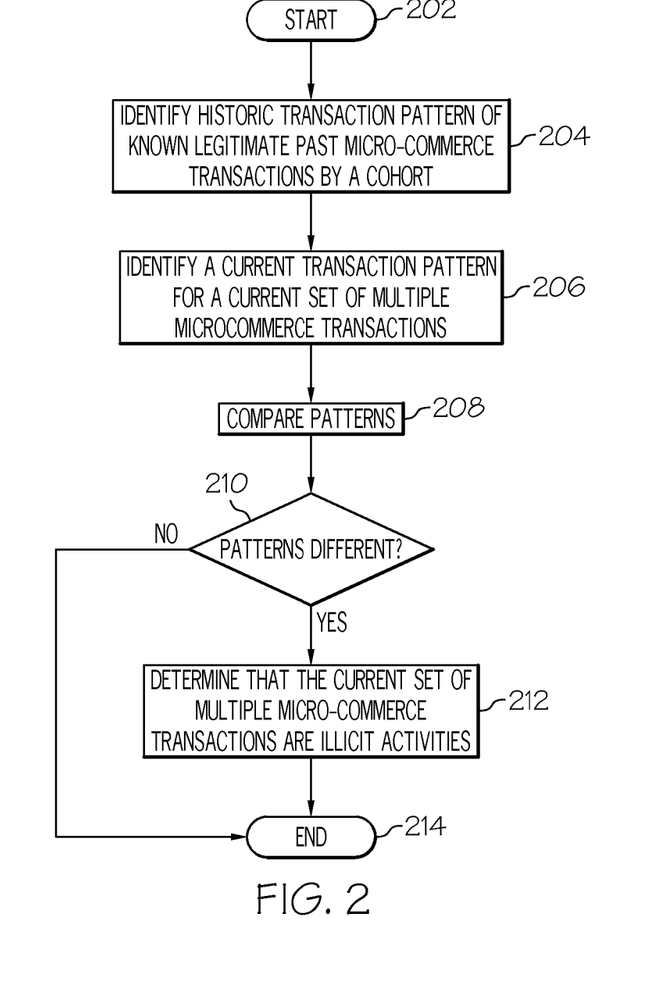
FIG. 2 is a high level flow chart of one or more exemplary steps taken by a processor to identify money laundering activities that use micro-commerce transactions.

Referring now to FIG. 2, a high level flow chart of one or more exemplary steps taken by a processor to detect money laundering that occurs through a use of micro-commerce transactions is presented. After initiator block 202, a processor (e.g., the processor 104 shown in computer 102 in FIG. 1) identifies an historic transaction pattern of known legitimate past micro-commerce transactions to a system (e.g., the micro-payment receiving computer(s) 154 shown in FIG. 1) by a cohort (block 204). This cohort is a set of multiple e-commerce users. Examples of such e-commerce users are on-line purchasers of music downloads, short-term lessees of applets or other software units, on-line advertisers, etc. The transactions are defined as being micro-transactions by virtue of their low currency amount (i.e., they are below a predetermined currency amount, such as $1.00 USD), and that they are high-volume (e.g., occur in a specific system more than some predetermined frequency, such as 10,000 times per hour). Examples of known historic patterns include, but are not limited to, quantifiable patterns of transactions, such as following a particular pattern in their time of day, frequency, volume, etc. Note that the transfer of micro-payments may be accomplished by entering credit card and payment amount information into a webpage; payment through cell phone entries (i.e., texting to a particular number, which results in the micro-payment being charged to the cell phone owner's account with the carrier); payment through a mobile-phone based money transfer service, etc.

As described in block 206, a current transaction pattern for a current set of multiple micro-commerce transactions is identified. In one embodiment, this current transaction pattern is for payments being sent from micro-payment transmitting computer(s) 152 (shown in FIG. 1) to micro-payment receiving computer(s) 154 (also shown in FIG. 1), as detected by computer 102. In one embodiment, this current set of multiple micro-commerce transactions is for purchases/leases of the same products/services/goods that are associated with the historic transaction pattern of known legitimate past micro-commerce transactions. In another embodiment, however, the current set of multiple micro-commerce transactions are for purchases/leases of different products/services/goods than those that are associated with the historic transaction pattern of known legitimate past micro-commerce transactions. Note further that this identification is not for a single transaction, but rather is for multiple transactions, such that, as described in block 208, a comparison can be made between the current transaction pattern and the historic transaction pattern.

As described in query block 210, if the current transaction pattern deviates from the historic transaction pattern beyond a predetermined level, then a determination is made that the current set of multiple micro-commerce transactions are being used for illicit activities, such as money laundering (block 212). That is, if the current transactions deviate too far from known legitimate patterns, then an assumption is made that the money from micro-payments is not being used to legitimately pay for a product/good/service, but rather is being transmitted for nefarious purposes, such as money laundering. In one embodiment, this identified money laundering takes the form of accepting the micro-payments without ever delivering the product/good/service, in accordance with an illegal agreement between the micro-payment sender and the micro-payment receiver. Thereafter, money from the transaction(s) can be split between the micro-payment sender and receiver, such that it looks like the money was part of a legitimate transaction, while in fact it was not. In another embodiment, the money laundering identified is that which occurs by overcharging for a product/good/service, and then splitting the excess payment between the micro-payment sender and receiver. Other embodiments identify other forms of money laundering, each of which are known to and understood by the law enforcement community. The process ends at terminator block 214.

In one embodiment, the identified money laundering uses micro-payments to launder money. In this embodiment, a determination can be made that money laundering is occurring if it takes too long for money received in a micro-commerce transaction to be transferred to a third party, such as a bank. For example, if the transaction were legitimate, then it would pass straight through to a bank or other fiduciary agent in a couple of hours. However, money laundering often requires that the money be routed through multiple intermediaries. Thus, if there is a delay in passing the money on (e.g., it takes 2 days instead of the usual 2 hours), then money laundering is suspected and/or identified. Thus, in this embodiment, money laundering is identified based on an average length of time between receiving the micro-payments and transferring the micro-payments to a third party exceeding a predetermined length of time.

In another embodiment, the identified money laundering uses micro-payments to launder money. In this embodiment, however, the money laundering is detected based on how many micro-payments are made during some period of time. For example, assume that a particular payment receiving computer (e.g., micro-payment receiving computer(s) 154 shown in FIG. 1) historically receives 100 micro-payments per day. If this count should spike to 10,000 micro-payments per hour, then money laundering is suspected and/or identified. Thus, in this embodiment, money laundering is identified based on a count of micro-payments made, in the current set of multiple micro-commerce transactions, exceeding a predetermined quantity.

In another embodiment, the identified money laundering uses micro-payments to launder money. In this embodiment, however, the money laundering is detected based on a pattern of micro-commerce purchases. For example, assume that there are six products offered for sale on a website, identified by the letters A, B, C, D, E, and F. Assume also that, in the past, money launderers have ordered products A, C, and E consistently. This pattern may be based on an algorithm used by a computer robot ("bot") in the micro-payment transmitting computer(s) (152) algorithm. That is, a computer may be programmed to select every other product offered on the website, in order to look like there was a conscious decision regarding which products to buy. However, overuse of this algorithm produces the consistent pattern A, C, E, which is indicative of past money laundering. Thus, in this embodiment, a set of products available for purchase is presented to micro-commerce consumers (e.g., on a webpage). A past ordered non-sequential pattern of purchases (e.g., A, C, E) from the set of products is identified. This pattern was followed by previous money launderers when making micro-payments to pay for the ordered non-sequential pattern of purchases in order to launder money. By matching the current set of multiple micro-commerce transactions to the past ordered non-sequential pattern of purchases (and their correlative micro-payments), the current money laundering is then detected/identified.

In one embodiment, the identified money laundering expressly uses micro-payments to launder money. In this embodiment, however, the detection of money laundering activities is based on whether or not the micro-commerce consumers buy items in a same or different genre. That is, assume that historical data shows that money launderers who user micro-commerce transactions consistently purchase either the same or different type(s)/genre(s) of product. Thus, in one embodiment, known money launderers always download music from the "pop" genre when using micro-payments to launder money. In another embodiment, however, known money launderers do just the opposite, by downloading music from genres that are so eclectic (e.g., pop, rap, classical, show tunes, jazz, polka, techno, disco, etc.) that it is unlikely that a single user would listen to and order from all such genres. Thus, in this embodiment, a set of products available for purchase is presented to micro-commerce consumers. Each product, from the set of products, is assigned to a genre. A determination is made that past money laundering has been performed by making micro-payments for products of different genres (or in another embodiment, a same genre). Thus, current money laundering is identified based on the current set of multiple micro-payments being made for products from different genres (or in another embodiment, the same genre).

In one embodiment, the identified money laundering expressly uses micro-payments to launder money. In this embodiment, however, an examination is made as to the time of day or day of the week that money launderers historically launder money using micro-payments. Thus, if historical data shows that money launderers consistently launder money at a particular time of day or on a particular day of the week, then current micro-payments that follow one of these patterns are suspected of being used to launder money. Thus, in this embodiment, a pattern of micro-payments used by previous money launderers is identified. This pattern of micro-payments is based on the micro-payments being consistently made at a specific time of day and/or a specific day of the week. By comparing this pattern of micro-payments to the current set of multiple micro-commerce transactions (i.e., the current set of multiple micro-commerce transactions follow the pattern of micro-payments used by previous money launderers), then current money laundering is identified.

In one embodiment, the identified money laundering expressly uses micro-payments to launder money. In this embodiment, however, a comparison of payment patterns for current micro-payers is made against payment patterns of a single known money launderer. Thus, assume that this known money launderer always launder money, using micro-payments, on a particular day of the week, or in a certain amount, or from a particular Internet café, etc. An assumption is made that this known money launderer has protégés who have learned his technique. Thus, if payments come in matching the pattern of the known money launderer, then an assumption is made that either that known money launderer, or her protégés, are once again using micro-payments to launder money. Thus, in this embodiment, a pattern of micro-payments used by a previous money launderer (i.e., a particular micro-payment payer) is identified. If the current set of multiple micro-payments matches the pattern of micro-payments used by previous money launderers, then current money laundering is detected/identified.

In one embodiment, the identified money laundering expressly uses micro-payments to launder money. In this embodiment, however, a determination is made as to whether previous money launderers have shown a pattern of laundering money by using the same-value micro-payments. That is, assume that known money launderers consistently made micro-payments of 10 cents across thousands of transactions, even though the transactions were for different goods/services/products. If a similar pattern occurs, then an assumption is made that money laundering is again occurring by use of such consistent micro-payments. Thus, in this embodiment, a pattern of micro-payments used by previous money launderers is identified. This pattern of micro-payments is based on the micro-payments consistently being for a same currency amount. If the current set of multiple micro-payments matches the pattern of micro-payments used by previous money launderers, then current money laundering is detected/identified.

In one embodiment, the identified money laundering expressly uses micro-payments to launder money. In this embodiment, however, a determination is made as to how many agents are within a hierarchy between the micro-payment payer and the payee. That is, if there are multiple intermediaries (i.e., "cut-outs") between the payer and payee, this is indicative of money laundering activities. Thus, in this embodiment, a pattern of micro-payments passing through a predetermined number of intermediaries is used to detect/identify money laundering.

In one embodiment, a spike in micro-commerce activity will demonstrate the likelihood of money laundering. For example, assume that a webpage historically receives only 20 hits per day inquiring about the products being offered by the webpage. If these inquiries should jump to 2,000 hits per day, then without some other legitimate explanation (e.g., a highly popular new product has just been released and offered for sale), then the sudden interest in this website is indicative of illicit activity, including money laundering. Thus, in this embodiment, a spike in micro-commerce activity is identified. This spike is an increase in micro-commerce activity beyond a predetermined level (e.g., more than 30 hits per day, in the example given above). A correlation is then made to the spike in micro-commerce activity to determine that money laundering activity is imminent, if not already occurring.

In one embodiment, the identified money laundering occurs by overpaying for a good/service/product. For example, assume that a particular music download normally costs 59 cents. If a set of customers pays 99 cents for each download (e.g., by using a secret code from the host music provider), then this is indicative of illicit activity, such as money laundering. Thus, in this embodiment, a price variance for a product offered in micro-commerce is identified. This price variance falls outside of a predetermined price range. For example, a pre-determined price variance of 10 cents may be allowable due to different system costs, etc. If so, paying 69 cents for a music download will not raise any alarms. However, paying 99 cents for a music download goes beyond the range of the predetermined price variance, and thus money laundering is suspected. Thus, micro-payments that exceed the price variance are identified as being money laundering activities.

Figure 3:
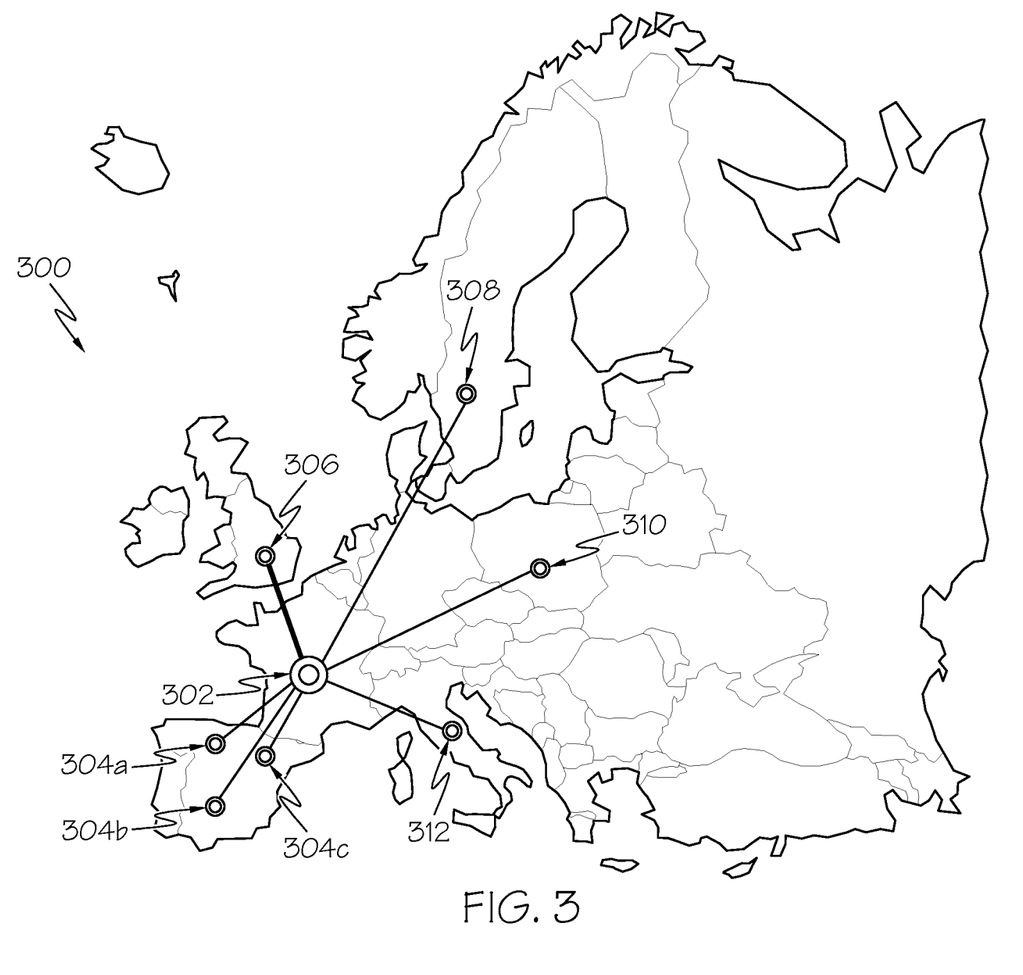
FIG. 3 illustrates an exemplary micro-payment activity map.

With reference now to FIG. 3, an exemplary micro-payment activity map 300 is presented. Assume that a micro-payment receiving computer (e.g., micro-payment receiving computer(s) 154 shown in FIG. 1) is located in France at location 302. In the example depicted in FIG. 3, there are several micro-payment transmitting computers throughout Europe, shown at locations 304a, 304b, 304c, 306, 308, 310, and 312. As depicted, there are three locations (304a, 304b, and 304c) of micro-payment transmitting computers in Spain. However, as indicated by the narrowness of the graphic lines connecting these locations to the micro-payment receiving computer at location 302, there is not much micro-payment activity from micro-payment transmitting computers 304a, 304b, and 304c. However, the micro-payment transmitting computer located in England at location 306 shows heavy micro-payment activity, as indicated by the broad line between the micro-payment transmitting computer at location 306 and the micro-payment receiving computer at location 302. Note that the other European micro-payment transmitting computers in Sweden (location 308), Poland (location 310), and Italy (location 312) also show minimal micro-transaction activity with the micro-payment receiving computer at location 302.

In one embodiment, location 302 for the micro-payment receiving computer, as well as the locations for micro-payment transmitting computers depicted in FIG. 3, may be a physical location, such as a continent, country, state, city, business or residential address, etc. In one embodiment, the locations depicted in FIG. 3 may be Internet Protocol (IP) addresses or Media Access Control (MAC) addresses for specific computers. In one embodiment, the locations depicted in FIG. 3 may be assigned to specific persons and/or enterprises, whether known or merely suspected. That is, the user of the micro-payment receiving computer and/or the user of the micro-payment transmitting computer may be either known, or the identity of such users may be guessed/estimated/suspected, to varying levels of certainty.

Thus, micro-payment activity map 300 presents graphical detail of activity between micro-payment transmitting computer locations and micro-payment receiving computer location(s) according to location icons and graphically-coded (e.g., by color, width, etc.) activity connector lines. This allows an administrator or law enforcement agency to rapidly identify areas of suspected illicit activity, such as money laundering through the use of micro-payments.

Note that while the graphical representations of the connective lines (i.e., their color/width/etc.) between micro-payment senders and receivers shows raw volume in one embodiment, in another embodiment these lines are graphically coded to show other features of the micro-transactions described above, such as the time of day/week of the transaction, the genre of goods supposedly being purchased, the monetary value of the transactions, etc. As described above, these transaction characteristics/features, either alone or in various combinations, are used to identify suspected money laundering through the use of micro-payments in micro-commerce (including micro-commerce on the Internet).

Note that while the discussions above have focused on the use of patterns to identify money laundering activities, the processes described herein are also applicable for identifying other nefarious activities. That is, all of the patterns described above can be utilized in non-money laundering activities, such as those described below.

For example, in one embodiment, comparing the current transaction pattern to the historic transaction pattern enables the detection of fake job postings that carry with them a small "processing fee." In this example, assume that a job posting includes a minimal fee (e.g., less than $1.00 USD) for "processing" an application for that job. However, the job does not actually exist, and the false posting is simply designed to collect the "processing fees." In order to detect such impropriety, the pattern of micro-payments is based on many micro-payments consistently being for a same currency amount to a single payee. If the pattern of the current set of multiple micro-payments matches the pattern of micro-payments used by previous illegal schemes, then current impropriety is detected/identified.

In another non-money laundering scenario, comparing the current transaction pattern to the historic transaction pattern enables the detection of bribery, including the bribery of law enforcement officials (particularly in under-developed countries). For example, assume that a high-volume of micro-transactions transfer many small payments (e.g., less than $0.25 USD) from multiple sources, but these payments are made daily to a single payee. Such high volume (i.e., from many senders), high frequency (e.g., daily) micro-payments to a single payee are indicative of bribery activities, particularly in an economically under-developed country in which small bribes are common. Thus, comparing the current transaction pattern with an historic transaction pattern (as just described) detects bribery activities and/or payments.

In another non-money laundering scenario, comparing the current transaction pattern to the historic transaction pattern enables the detection of narcotic trafficking. For example, assume that many micro-payments are of uniform amounts, are being made to a single payee, and the single payee consistently removes money from a payment escrow account (that receives the actual micro-payments) in order to keep the balance in the account below an amount that would trigger mandatory reporting to a country's banking regulators. This pattern is consistent with narcotic trafficking, such that comparing the current transaction pattern with an historic transaction pattern (as just described) detects narcotic trafficking payments.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modi- fications and variations are possible without departing from the scope of the invention defined in the appended claims.

What is claimed is:

1. A processor-implemented method of detecting money laundering, wherein the money laundering occurs through a use of micro-commerce transactions, and wherein the processor-implemented method comprises:

a processor identifying an historic transaction pattern of known legitimate past micro-commerce transactions by a cohort, wherein the micro-commerce transactions are transactions, conducted via micro-payment computers connected via a network, that each have a value of less than $0.01 USD, and wherein the micro-commerce transactions exceed 1,000 transactions per hour;

the processor identifying a current transaction pattern for a current set of multiple micro-commerce transactions;

the processor comparing the current transaction pattern to the historic transaction pattern;

the processor, in response to determining that the current transaction pattern deviates from the historic transaction pattern beyond a predetermined level, determining that the current set of multiple micro-commerce transactions are being used for money laundering, wherein the money laundering uses micro-payments to launder money; and the processor further determining that the current set of multiple micro-commerce transactions are being used for money laundering based on an average length of time, between a first computer receiving the micro-payments and the first computer transferring the micro-payments to a second computer, exceeding a predetermined length of time.

2. The processor-implemented method of claim 1, further comprising:

the processor matching the current transaction pattern to a known transaction pattern of multiple micro-payments made to pay for an illegal non-money laundering activity; and the processor utilizing a match between the current transaction pattern and the known transaction pattern of multiple micro-payments made to pay for the illegal non-money laundering activity to identify a current illegal non-money laundering activity, wherein the current illegal non-money laundering activity offers an illegal service, and wherein the current set of multiple micro-commerce transactions are paying for the illegal service.

3. The processor-implemented method of claim 1, further comprising:

the processor further determining that the current set of multiple micro-commerce transactions are being used for money laundering based on a count of micro-payments made, in the current set of multiple micro-commerce transactions, exceeding a predetermined quantity during a predetermined period of time.

4. The processor-implemented method of claim 1, further comprising:

the processor presenting a set of products available for purchase to micro-commerce consumers;

the processor identifying a past ordered non-sequential pattern of purchases from the set of products, wherein previous money launderers used micro-payments to pay for the past ordered non-sequential pattern of purchases in order to launder money, wherein the past ordered non-sequential pattern of purchases are purchases of products that are offered for sale in a specific sequential order on a website, and wherein the past ordered non-sequential pattern of purchases is for purchases of products that do not follow the specific sequential order of products offered on the website; and the processor further determining that the current set of multiple micro-commerce transactions are being used for money laundering based on the current set of multiple micro-payments matching the past ordered non-sequential pattern of purchases.

5. The processor-implemented method of claim 1, further comprising:

the processor presenting a set of products available for purchase to micro-commerce consumers;

the processor assigning each product, from the set of products, to a genre;

the processor determining that past money laundering has been performed by making micro-payments for products of different genres; and the processor further determining that the current set of multiple micro-commerce transactions are being used for money laundering based on the current set of multiple micro-payments being made for products from different genres.

6. The processor-implemented method of claim 1, further comprising:

the processor presenting a set of products available for purchase to micro-commerce consumers;

the processor assigning each product, from the set of products, to a genre;

the processor determining that past money laundering has been performed by making micro-payments for products of a same genre; and the processor further determining that the current set of multiple micro-commerce transactions are being used for money laundering based on the current set of multiple micro-payments being made for products from the same genre.

7. The processor-implemented method of claim 1, further comprising:

the processor identifying a pattern of micro-payments used by previous money launderers, wherein the pattern of micro-payments is based on the micro-payments being consistently made at a specific time of day; and the processor further determining that the current set of multiple micro-commerce transactions are being used for money laundering based on the current set of multiple micro-payments following the pattern of micro-payments used by previous money launderers.

8. The processor-implemented method of claim 1, further comprising:

the processor identifying a pattern of micro-payments used by previous money launderers, wherein the pattern of micro-payments is based on the micro-payments being consistently made on a specific day of the week; and the processor further determining that the current set of multiple micro-commerce transactions are being used for money laundering based on the current set of multiple micro-payments matching the pattern of micro-payments used by previous money launderers.

9. The processor-implemented method of claim 1, further comprising:

the processor identifying a pattern of micro-payments used by a previous money launderer, wherein the pattern of micro-payments is based on the micro-payments being from a particular micro-payment payer; and the processor further determining that the current set of multiple micro-commerce transactions are being used for money laundering based on the current set of multiple micro-payments matching the pattern of micro-payments used by the previous money launderer.

10. The processor-implemented method of claim 2, wherein the current illegal non-money laundering activity is a fraudulent job posting service, wherein the current set of multiple micro-commerce transactions are paying a processing fee for the fraudulent job posting service, and wherein the processor-implemented method further comprises:
the processor matching the current transaction pattern to a known transaction pattern of multiple micro-payments made to pay for a processing fee for the fraudulent job posting service; and
the processor utilizing a match between the current transaction pattern and the known transaction pattern of multiple micro-payments made to pay for the processing fee for the fraudulent job posting service to identify the fraudulent job posting service.

11. The processor-implemented method of claim 2, wherein the current illegal non-money laundering activity is bribery, and wherein the current set of multiple micro-commerce transactions are paying bribes, and wherein the processor-implemented method further comprises:
the processor matching the current transaction pattern to a known transaction pattern of multiple micro-payments made to pay bribes; and
the processor utilizing a match between the current transaction pattern and the known transaction pattern of multiple micro-payments made to pay bribes to identify current bribery activity.

12. The processor-implemented method of claim 1, wherein the processor-implemented method further comprises:
the processor identifying an allowable price variance for a product offered in micro-commerce; and
the processor identifying micro-payments that exceed the allowable price variance as being money laundering activities.

13. A computer program product for detecting money laundering in micro-commerce transactions, the computer program product comprising:
a computer readable storage media;
first program instructions to identify an historic transaction pattern of known legitimate past micro-commerce transactions by a cohort;
second program instructions to identify a current transaction pattern for a current set of multiple micro-commerce transactions;
third program instructions to compare the current transaction pattern to the historic transaction pattern; and
fourth program instructions to, in response to determining that the current transaction pattern deviates from the historic transaction pattern beyond a predetermined level, determine that the current set of multiple micro-commerce transactions are being used for money laundering, wherein the money laundering uses a current set of multiple micro-payments to launder money;
fifth program instructions to present a set of products available for purchase to micro-commerce consumers;
sixth program instructions to identify a past ordered non-sequential pattern of purchases from the set of products, wherein previous money launderers used micro-payments to pay for the past ordered non-sequential pattern of purchases in order to launder money, wherein the past ordered non-sequential pattern of purchases are purchases of products that are offered for sale in a specific sequential order on a website, and wherein the past ordered non-sequential pattern of purchases is for purchases of products that do not follow the specific sequential order of products offered on the website; and
seventh program instructions to further determine that the current set of multiple micro-commerce transactions are being used for money laundering based on the current set of multiple micro-payments matching the past ordered non-sequential pattern of purchases; and wherein the first, second, third, fourth, fifth, sixth, and seventh program instructions are stored on the computer readable storage media.

14. The computer program product of claim 13, wherein the money laundering uses a current set of multiple micro-payments to launder money, and wherein the computer program product further comprises:
eighth program instructions to further determine that the current set of multiple micro-commerce transactions are being used for money laundering based on an average length of time between receiving the micro-payments and transferring the micro-payments to a third party exceeding a predetermined length of time; and wherein the eighth program instructions are stored on the computer readable storage media.

15. The computer program product of claim 13, wherein the money laundering uses a current set of multiple micro-payments to launder money, and wherein the computer program product further comprises:
eighth program instructions to present a set of products available for purchase to micro-commerce consumers;
ninth program instructions to identify an ordered non-sequential pattern of purchases from the set of products, wherein previous money launderers used micro-payments to pay for the ordered non-sequential pattern of purchases in order to launder money; and
tenth program instructions to further determine that the current set of multiple micro-commerce transactions are being used for money laundering based on the current set of multiple micro-payments matching the ordered non-sequential pattern of purchases; and wherein the eighth, ninth, and tenth program instructions are stored on the computer readable storage media.

16. The computer program product of claim 13, wherein the money laundering uses a current set of micro-payments for products to launder money, and wherein the computer program product further comprises:
eighth program instructions to identify an allowable price variance for a product offered in micro-commerce; and
ninth program instructions to identify micro-payments that exceed the allowable price variance as being money laundering activities; and wherein the eighth and ninth program instructions are stored on the computer readable storage media.

17. A computer system comprising:
a central processing unit (CPU), a computer readable memory, and a computer readable storage media;
first program instructions to identify an historic transaction pattern of known legitimate past micro-commerce transactions by a cohort;
second program instructions to identify a current transaction pattern for a current set of multiple micro-commerce transactions;
third program instructions to compare the current transaction pattern to the historic transaction pattern;

fourth program instructions to, in response to determining that the current transaction pattern deviates from the historic transaction pattern beyond a predetermined level, determine that the current set of multiple micro-commerce transactions are being used for money laundering;

fifth program instructions to identify an allowable price variance for a product offered in micro-commerce; and sixth program instructions to further determine that the current set of multiple micro-commerce transactions are being used for money laundering by identifying micro-payments that exceed the allowable price variance as being money laundering activities; and wherein the first, second, third, fourth, fifth, and sixth program instructions are stored on the computer readable storage media for execution by the CPU via the computer readable memory.

18. The computer system of claim 17, wherein the money laundering uses a current set of multiple micro-payments to launder money, and wherein the computer system further comprises:

seventh program instructions to further identify the money laundering based on an average length of time between receiving the micro-payments and transferring the micro-payments to a third party exceeding a predetermined length of time; and wherein the seventh program instructions are stored on the computer readable storage media for execution by the CPU via the computer readable memory.

19. The processor-implemented method of claim 1, further comprising:

generating on a display, by one or more processors, a micro-payment map of locations in which micro-payment activity is occurring, wherein the locations are Media Access Control (MAC) addresses of the first computer and the second computer that are involved in micro-payment activities, and wherein the micro-payment map displays activity levels of micro-payment activities; and identifying locations in which money laundering is occurring based on a display of the levels of micro-payment activities, wherein the activity levels of micro-payment activities describe how many micro-payment transactions have occurred between two MAC-address locations within a predetermined amount of time.

20. The processor-implemented method of claim 1, wherein the micro-commerce transactions use micro-payments of less than a predetermined amount of currency to pay for each of a predetermined minimum quantity of transactions within a predefined period of time.

* * * * *